July 1, 1952 H. L. LESIGNE 2,602,122
AUTOMATIC TELEPHONE SYSTEM FOR NONCONSECUTIVELY NUMBERED GROUPED LINES
Filed July 14, 1948 4 Sheets-Sheet 1

INVENTOR
HENRI LOUIS LESIGNE
BY Adams & Burch
ATTORNEYS

July 1, 1952 H. L. LESIGNE 2,602,122

AUTOMATIC TELEPHONE SYSTEM FOR NONCONSECUTIVELY NUMBERED GROUPED LINES

Filed July 14, 1948 4 Sheets-Sheet 2

INVENTOR
HENRI LOUIS LESIGNE

By Adams + Bush

ATTORNEYS

July 1, 1952 H. L. LESIGNE 2,602,122

AUTOMATIC TELEPHONE SYSTEM FOR NONCONSECUTIVELY NUMBERED GROUPED LINES

Filed July 14, 1948 4 Sheets-Sheet 3

INVENTOR
HENRI LOUIS LESIGNE

By Adams + Bush

ATTORNEYS

July 1, 1952 H. L. LESIGNE 2,602,122

AUTOMATIC TELEPHONE SYSTEM FOR NONCONSECUTIVELY NUMBERED GROUPED LINES

Filed July 14, 1948 4 Sheets-Sheet 4

INVENTOR
HENRI LOUIS LESIGNE

By Adams & Bush

ATTORNEYS

Patented July 1, 1952 2,602,122

UNITED STATES PATENT OFFICE 2,602,122

AUTOMATIC TELEPHONE SYSTEM FOR NON-CONSECUTIVELY NUMBERED GROUPED LINES

Henri Louis Lesigne, Vanves, France, assignor to Compagnie Industrielle des Telephones, Paris, France, a French corporation Application July 14, 1948, Serial No. 38,598
In France July 11, 1947

3 Claims. (Cl. 179—18)

My invention relates to special switching arrangements for automatic telephone systems having subscribers to whom a plurality of lines are assigned.

In automatic telephone or telegraph systems, the subscribers generally have the possibility of using several lines for sending and receiving their calls.

It is usual practice to permit another subscriber to dial these grouped lines of one subscriber under a single listed number, the other lines of the group being automatically and successively explored when the first lines are busy, this exploration continuing until a free line is found, and a calling subscriber only gets the busy signal when all the lines of the group have been explored and found busy.

It is also possible to reach any particular desired line of the group, other than the first line, without exploring any other lines of the group, by dialing it under its own number.

Arrangements of this kind permit great operating flexibility, but have the draw back of requiring the consecutive grouping together of all of the lines of the group. The lines of the group must occupy successive positions on the connector, and the subscriber's listed number must be the first line of the series of the group, since, when this listed number is dialed, it must cause the exploration of the entire group of lines, if necessary. When a given subscriber, using grouped lines, finds it necessary to increase the number of lines in his group, he cannot be given the proper service if the number of the line which follows the last number of his group has already been assigned to another subscriber. It is then necessary to list for such a subscriber, a separate number to be dialed separately if all of the lines in his consecutive group are busy.

An object of the present invention is to provide a circuit arrangement which affords the same facilities for operation as the known arrangements of the prior art, but does not require that all of the lines of a group assigned to one particular subscriber, be assigned in a continuous run of successive numbers without interruption on the banks of the finding member.

The arrangement in accordance with the present invention comprises a relay, which, when the first line is busy, causes the rotation of the line finding member, the lines belonging to one given desired called subscriber being distinguished by the fact that the terminal contacts corresponding to such lines on a selector band are given a special polarity, which enables the connector to detect them in passing around over the bank, and to pass, without stopping, over the lines which belong to other subscribers.

To the terminal contact corresponding to the last line of a particular subscriber, there is also applied a special polarity potential which causes the busy signal to be sent to the calling subscriber if the last line is busy.

The invention will be understood from the following specification and the accompanying drawings, wherein.

Figure 1:
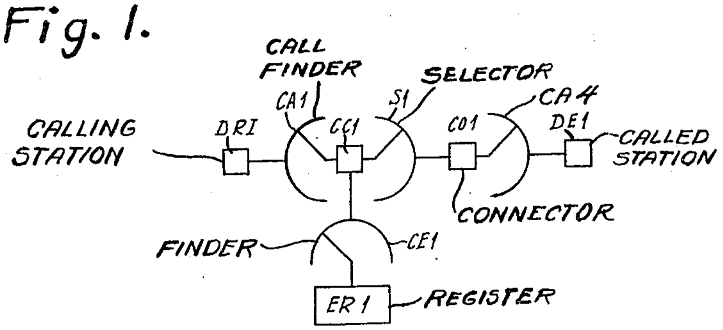
Fig. 1 is block diagram of a known type of telephone system which uses a common marking multiple, to which type of system the present invention may be applied.
Figure 2:
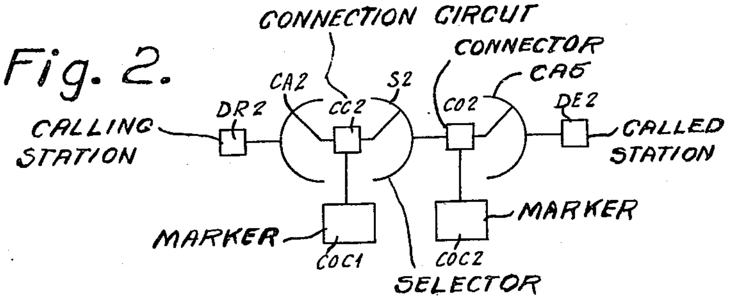
Fig. 2 is a block diagram of another known type of telephone system with separate individual marking devices for each stage, to which type of system the present invention may be applied.
Figure 4:
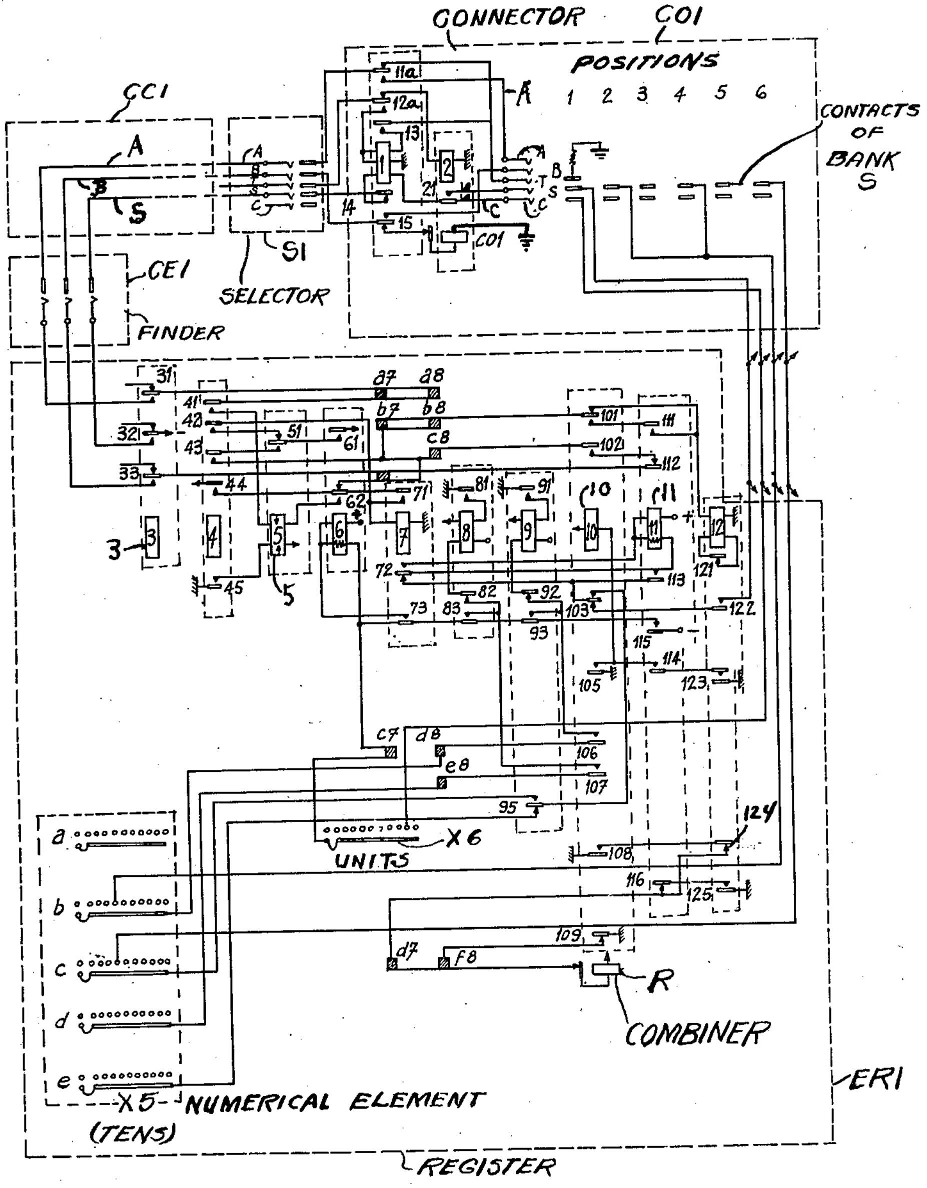
Figure 5:
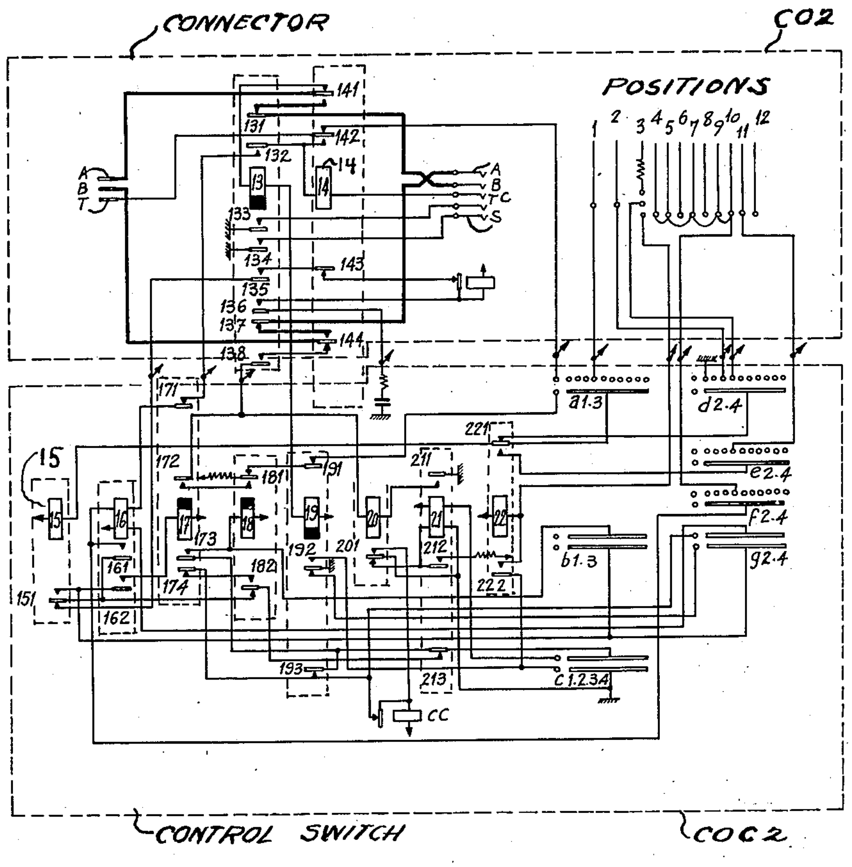

Fig. 4 is a circuit diagram showing another embodiment of the application of the present invention of grouped subscriber line control to the known marking multiple type of system of Fig. 1, employing a reduced number of control wires; and Fig. 5 is a circuit diagram showing an embodiment of the application of the present invention of grouped subscriber line control to the known individual marking multiple system of the type shown in Fig. 2, in which the selection of the group is effected by means of the numerical element receiving the unit digit.

Referring to Fig. 1, showing the block diagram of a known type of automatic telephone system, with common marking multiple, DR1 represents a calling subscriber who can reach a called subscriber DE1 by means of a connecting circuit CC1 and a selector CO1.

The setting of the call finder CA1, of selector S1, and of the connector CO1 is provided for by means of a register ER1 which reaches the connecting circuit by means of a finder CE1.

In this system of Fig. 1, which is known as the L43 system, as described, for instance, in my copending application Ser. No. 617,379, filed September 19, 1945, now abandoned, the use of a separate insulated battery individual to each register, in addition to the regular battery of the exchange, permits the use of a marking multiple common to all the marking devices. It is thus possible to eliminate special marking devices which are individual for each stage. This separate individual insulated battery of the L43 system, which is in addition to the regular battery, is entirely insulated from ground, and its terminals have separate, ungrounded connections.

Figure 3:
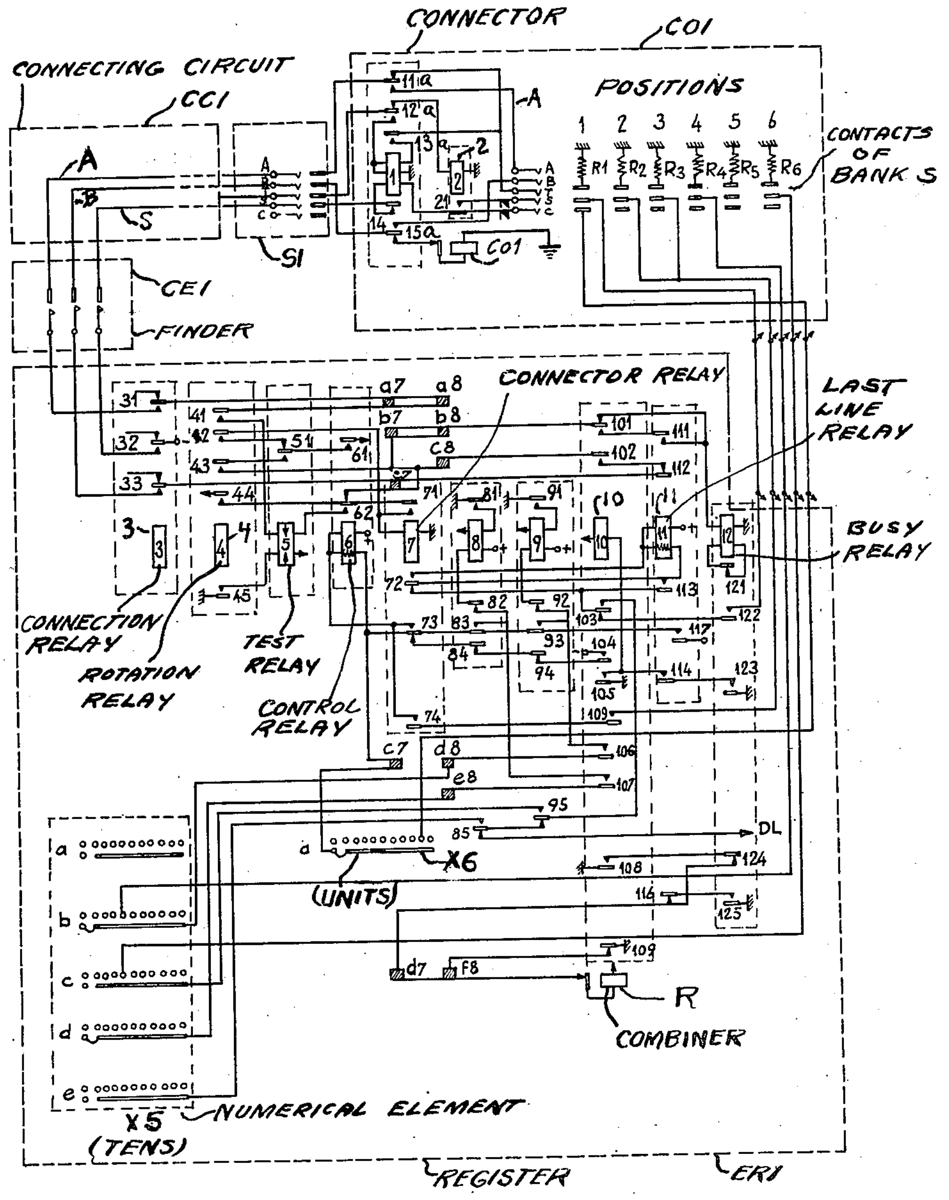
Fig. 3 is a circuit diagram showing the application of the present invention of grouped subscriber line control to the known common marking multiple type of system of Fig. 1.

Fig. 2 shows the block diagram for a known type of system with separate marking devices, which is known as the R6 system. In Fig. 2, the calling subscriber DR2 reaches the called subscriber DE2, by means of a detecting circuit CC2, and a selector-connector CO2. The selector S2 is set in position by means of a marking device COC1, and the connector-selector by means of a marking device COC2. These marking devices are composed of a control switch which causes the rotation of the member to be set, and checks its position at each instant by means of an assembly of control wires constituting a marking multiple. In order to avoid the crossing of control circuits, it is necessary to allocate one marking multiple to each marking device. This leads to the provision of a marking device at each selection stage. Fig. 3 and Fig. 4, respectively, represent two different examples of the application of the arrangement of the present invention to the L43 type of known system, as shown in Fig. 1.

In Figs. 3 and 4, there are shown a part of the register, the elements of the connecting circuit CC1 which are necessary to the explanation of the operation of the arrangement according to the present invention, and the connector CO1.

The control switch COC2 and the connector CO2 are shown in Fig. 5.

In the following description, in describing relay circuits, the letter T preceding the reference number of a relay contact, designates a contact which is closed when the corresponding relay winding is energized with current, and the letter R designates the relay contact which is closed when the energizing current is cut off from the winding of this relay.

In assigning reference characters, the contacts of a relay are designated by reference numerals consisting of the reference number of the relay followed by a single digit, as 23 designates the third contact of relay 2.

In the following description, the terms "ground" or "earth" and "battery," respectively designate the positive pole and the negative pole of the general or regular battery of the exchange, and the signs + and − represent the positive pole and the negative pole of the separate battery insulated from ground and individual to each register, such as is used in the L43 type of system shown in Fig. 1.

Fig. 3 shows in more detail a connector which corresponds to the connector CO1 shown in Fig. 1. On the banks of this connector CO1, only six positions have been shown, by their terminal contacts, and these positions have been numbered 1 to 6, and it has also been assumed that position 1 represents the first line of an assigned group of lines, and that the positions 2, 3, 4, correspond to other lines belonging to the same consecutive group of numbers, and that position 4 corresponds to the last consecutive line of this integral consecutive group. It has also been assumed that position 5 corresponds to a line which does not belong to this particular subscriber but belongs to another subscriber, and that position 6 corresponds to an isolated line which belongs to the particular subscriber to whom the group is assigned, and is the last line assigned to this particular subscriber, who has positions 1, 2, 3, 4, and that beyond position 6 there are no other lines assigned to this subscriber.

Fig. 3 also shows the brushes of the selector S1 of Fig. 1, and also those of the finder CE1, and the connection relays, 1, 2, of the connector CO1.

Only those circuits of the register ER1 are shown which are necessary for an understanding of the present invention.

In these circuits, X5 and X6 are the numerical elements which respectively receive the tens digit and the units digit.

R is the sequence switch or combiner and its actuating magnet, of which the contacts are shown as *a7*, *b7*, *c7*, *d7*, *e7*, for position 7, and as *a8*, *b8*, *c8*, *d8*, *e8*, *f8*, for position 8.

Positions 1 to 6 have not been shown, since they correspond in the sequence switch or combiner R, to operations employed for the searching of a connector, and do not come within the scope of the present invention. The succeeding positions following position 8 have not been shown.

1 and 2 are the two connector relays. Relay 1 provides for the connection of the connector brushes with the connecting circuit CC1. It is a marginal relay. It only operates when a current of sufficient intensity flows through its lower winding. Relay 2 operates as soon as the connector is engaged and shunts by means of its contact 21 the brush S on the winding of relay 1.

In Fig. 3, the connection relay is shown at 3, at 4 is shown the relay which causes the rotation of the selectors and connectors, at 5 is shown the test relay, at 6 is shown the control relay, at 7 is shown the relay causing the connection of the connector.

In this figure there are shown at 8 and 9, the two relays designating in connection with the banks *b*, *c*, *d*, *e*, of numerical element X5, the called line group in which the hunting is to take place. At 10 is shown the relay which differentiates the case of the grouped lines of a subscriber having a plurality of lines from the case of a subscriber having only a single line. At 11 is shown the first and last line relay, and at 12 is shown the busy relay.

Referring further to Fig. 3, when the digits dialed are received, the rotation relay 4 is actuated and closed by circuits not shown in the drawing. The connector is set in rotation over the circuit:

Ground (regular positive battery), winding and breaker, contact R15, wire B in the stages preceding the connector, contact T33, cam *e* in position 7 of R, R62, T44, negative regular battery.

When the connector passes onto the called line of the called subscriber, the control relay 6 is energized over the circuit:

Positive terminal of insulated battery, winding of relay 6, combiner contact *c7*, bank *a* of numerical element X6 in the position of the units digit, contact C in position 1 of the connector, winding of relay 1, contact R14, wire S, contact T32, negative terminal of the insulated battery. Contact stubs B of connector CO1 are connected to a ground through resistors R1 to R6 when the corresponding lines are free. They are connected to a ground through resistances having a different value when the corresponding lines are busy or disconnected.

The test relay 5 is actuated in operated position during all of these operations, when the corresponding line is free, over the circuit:

Ground (positive regular battery), contact T45, winding of relay 5, negative regular battery.

When the control relay 6 is energized, the upper winding of test relay 5 is energized through the circuit:

Ground (positive terminal of regular battery), resistance R1, contact and brush T of the connector, contact R11, wire A, contact T31, combiner contact a7, relay contact T41, winding of relay 5, T62, T44, negative regular battery.

In this case of a free line, no shunt takes place on this circuit, and the relay 5 has its two windings balanced. Since the two windings of relay 5 are connected to oppose each other, relay 5 releases, which action characterizes a free line.

If the called line is busy, the communication being handled has applied a "busy" polarity on the contact T by the brush T of the connector employed. This causes a shunt on the circuit of the upper winding of test relay 5. Test relay 5 is not then balanced and remains in operated position.

Busy relay 12 then has sufficient time to be energized over the circuit:

Ground (positive regular battery), winding of relay 12, relay contact R101, combiner contact b7, relay contact T43, T51, T61, negative regular battery. If the line is the first of a continuous group of lines, relay 11 is energized over the circuit:

Positive terminal of insulated battery, winding of relay 11, relay contact R72, R103, T122, contact and brush S of the connector, relay contact T21, winding of relay 1, wire S, relay contact T32, and negative terminal of insulated battery. As the current passes through the non-inductive resistance of relay 11, the current which flows through marginal relay 1 is not strong enough to energize it.

Relay 10 is energized over the circuit:

Ground (positive terminal of regular battery), relay contact T123, T114, winding of relay 10, negative regular battery.

The relay 11 releases again, its actuating circuit being opened at relay contact R103.

Relay 12 releases, its energized circuit being opened at relay contact R101, and no longer finds a circuit, since, in releasing, relay 11 has opened its contact T111.

The sequence switch or combiner of the register passes on to position 8 through the circuit:

Ground (positive pole of regular battery), relay contact T108, R124, combiner contact d7, combiner breaker and winding R, and negative regular battery.

On combiner position 8, the connector resumes its rotation under the control of the test relay by virtue of the circuit:

Ground (positive terminal of regular battery), breaker and winding, wire B, T33, R112, T102, combiner contact c8, relay contact T43, T51, T61, negative regular battery.

In the case of Fig. 3, it has been assumed that lines 2, 3, 4, were on successive positions, while line 6 is isolated from the previously mentioned group by intervening position 5.

In positions 2 and 3, the control relay 6 is held by virtue of the circuit:

Positive terminal of the insulated battery, control relay 6, relay contact R73, R84, R94, T104.

Relay 9 is not energized.

If one of the two lines 2 or 3 is free, the test relay 5 is balanced and releases.

Connector relay 7 is energized over the circuit:

Ground (positive terminal of regular battery), relay 7, contact T42, R51, T61, negative regular battery.

The connector is stopped, its energizing circuit being opened at T51.

Relay 1 of the connector is energized over the circuit:

Positive terminal of the insulated battery, winding of relay 6, contact T74, T109, contact and brush S of the connector, relay contact T21, winding of relay 1, relay contact R14, wire S, T32, negative terminal of the insulated battery. Relay 1 closes its holding contact 12 before contact 14 is opened (make before-break contact).

The connector is connected and the wires are extended toward the called subscriber.

If neither of the lines 2 or 3 is free, the connector arrives in position 4.

At this position the group relay 9 is energized over the circuit:

Positive terminal of the insulated battery, winding of relay 9, relay contact R92, T106, combiner contact d8, bank b of numerical element X5 in position 4, contact and brush S in position 4 of the connector, relay contact T21, lower winding of relay 1, relay contact R14, wire S, T32, negative terminal of the insulated battery. The resistance of the lower winding of relay 9 is sufficiently great so that marginal relay 1 is not operated.

Relay 9 is held by virtue of the circuit:

Ground (positive terminal of regular battery), relay contact T91, winding of relay 9, negative regular battery.

The control relay 6 is then held by virtue of the circuit:

Positive terminal of the insulated battery, winding of relay 6 contact T73, relay contact T93, T106, combiner contact d8, bank d of numerical element X5, contact and brush S of the connector, relay contact T21, winding of relay 1, R14, wire S, relay contact T32, negative terminal of the insulated battery.

The holding circuit on positions 2 and 3 is opened at relay contact R94.

The rotating circuit of the connector stepping magnet is notchanged and remains under the control of the test relay 5.

If the line in position 4 is free, the test relay 5 releases. The connector is stopped and connector relay 7 is energized by virtue of the circuit already described.

The connection relay 1 of the connector CO-1 is energized because the resistance of control relay 6 is short circuited by relay contact T73, and the relay 1 becomes energized over the circuit:

Positive terminal of the insulated battery, winding of relay 6, T73, T93, T106, combiner contact d8, bank b of numerical element X5, contact and brush S of the connector in position 4, relay contact T21, lower winding of relay 1, relay contact R14, wire S, contact T32, negative terminal of the insulated battery.

The line wires are then extended toward the called subscriber.

If the line 4 is busy, the connector continues its rotation. On position 5, the control relay 6 releases, which prevents the line from being taken even if it is free, because the test relay 5 is no longer in circuit, its circuit being open at relay contact T62, and the connector does not stop on position 5.

The connector continues to rotate by virtue of the continuity of the circuit:

Ground (positive regular battery), winding and breaker, relay contact R15, wire B, relay contact T33, R112, T102, combiner contact c8, relay contact R62, T44, negative regular battery.

When the connector arrives in position 6 corresponding to the isolated line separate from the continuous group belonging to the same subscriber and assumed here to be the last line, the relay 11 is energized over the circuit;

Positive terminal of the insulated battery, winding of relay 11, relay contact R72, T103, T95, bank C of numerical element X5, contact and brush S of the connector in position 6, relay T21, winding of relay 1, R14, wire S, T32, negative terminal of insulated battery.

The circuit for rotation of the connector is opened at relay contact R112. The control relay 6 is energized by virtue of the circuit:

Positive terminal of the insulated battery, winding of relay 6 contact T73, relay contact T117, negative terminal of the insulated battery.

The test relay 5 is energized by virtue of closing of relay contact T62.

If the line 6 is free, the test relay 5 releases.

The connector relay 7 is energized by virtue of the circuit:

Ground (positive terminal of the regular battery) winding of relay 7, relay contact T42, R51, T61, negative regular battery.

The resistance of relay 11 is short-circuited by relay contact T72, and relay 1 is energized over the circuit:

Positive terminal of insulated battery, winding of relay 11, relay contact T72, T113, T103, T95, bank C of numerical element X5, contact and brush S in position 6, relay contact T21, winding of relay 1, R14, wire S, relay contact T32, negative terminal of the insulated battery.

If the line 6 is busy, the test relay 5 remains operated, and busy relay 12 is energized over the circuit:

Ground (positive terminal of the regular battery), winding of busy relay 12, relay contact T111, T101, combiner contact b8, relay contact T43, T51, T61, negative terminal of the regular battery.

Relay 12 is the busy relay of the register ER1. When it is energized it causes the sending of the busy signal to the calling subscriber by circuits not coming within the scope of the present invention.

If, in the same decade of lines, there is a second subscriber having isolated or separated lines inserted between the lines of the first mentioned subscriber, then, when passing onto the last grouped line of the second subscriber, the wire S is no longer connected to relay 9, but to another similar relay 8, by a similar circuit, taking a path through the bank *d* of numerical element X5 instead of through the bank *d*. This arrangement makes it possible to have in each decade two subscribers having isolated lines, that is, twenty subscribers per hundred. If this number is considered insufficient, it can be increased in accordance with the present invention, by the addition of a third relay such as 8 and 9 and supplementary banks on numerical element X5. Similarly, passing on to reach the last line causes the energization of relay 11 over the circuit:

Positive terminal of insulated battery, winding of relay 11, relay contact T103, R95, T85, bank *e* of numerical element X5, contact and brush of CO-1, relays 1 and 2, R14, wire S, contact T32, negative terminal of insulated battery.

In the embodiment shown in Fig. 3, it is possible to have an unlimited number of subscribers, all of whose lines are grouped, the arrangement according to the present invention only coming into use when the subscriber has one or more lines isolated or separated from each other.

In fact, the embodiment of the invention according to the arrangement of Fig. 3, makes it possible to have an unlimited number of subscribers with several lines when the several lines are consecutively numbered, on the condition that there is no other line inserted between those of a group. This assumes a control wire of an intermediate line, common to all the groups, (wires multipled on positions 2 and 3 of Fig. 3) and used when neither of the relays 8 and 9 has operated. Similarly, there is a last-line wire (wire DL of Fig. 3) common to all of the groups.

Fig. 4 represents another embodiment in accordance with the present invention. This embodiment of Fig. 4 makes it possible to reduce the number of control wires between the connectors and the registers.

The embodiment of Fig. 4 makes it possible to eliminate the two wires which have been mentioned, that is, the control wire of an intermediate line, common to all of the groups, and the last-line wire DL, as just mentioned for Fig. 3.

In Fig. 4 there are found again, the same elements as in Fig. 3. In particular, there are found again the connector CO1, and also the contacts of bank S corresponding to any six positions which, however, must be consecutive.

Position 1 corresponds to the first line of a group.

Position 2 and position 4 correspond to the second and third line of a group.

Positions 3 and 5 correspond to lines not belonging to the desired group, that is, they belong to other subscribers.

Position 6 is the last line of the group which is to be explored.

The brushes of the selector S1, as well as the brushes of the finder CE1 have also been shown in Fig. 4. Finally, the representation of the register ER1 has been limited only to those circuits which are necessary for an understanding of the present invention, and the relays fulfilling the same function in Fig. 4, as in Fig. 3, carry the same reference characters.

When the connector arrives on the line in position 2, the last line of the consecutive group, the relay 9 is energized over the circuit:

Positive terminal of the insulated battery, winding of relay 9, relay contact R92, T106, combiner contact d8, bank *b* of numerical element X5 in position 4, contact and brush S of the connector in position 2, relay contact T21, winding of relay 1, R14, wire S, T32, negative terminal of the insulated battery.

Relay 9 is held by virtue of the circuit:

Ground (positive terminal of the regular battery), relay contact T91, winding of relay 9, negative regular battery.

The control relay 6 is held by virtue of the circuit:

Positive terminal of the insulated battery, winding of relay 6, relay contact T93, T106, combiner contact d8, bank *b* of numerical element X5, contact and brush *S* of the connector in position 2, relay contact T21, winding of relay 1, R14, wire S, T32, negative terminal of the insulated battery.

If the line is free, the test relay 5 releases.

The connector relay 7 is energized over the circuit:

Ground (positive terminal of regular battery), winding of relay 7, relay contact T42, R51, T61, negative regular battery.

The connector relay 7 short-circuits at relay contact T73 the resistance of control relay 6, and relay 1 of the connector CO-1 can then close.

If the called line is busy, the connector continues to rotate by virtue of the completed circuit:

Ground (positive terminal of regular battery), winding and breaker, relay contact R15, wire B, relay contact T33, R112, T102, C8, T43, T51, T61, negative regular battery.

Referring further to Fig. 4, position 3 which is then next reached corresponds to a line which serves another subscriber.

In this position 3, contact S of the connector CO-1 has not made connection. The control relay 6 is no longer held, and releases. The test relay 5 is no longer in circuit, since its energizing circuit has been opened at relay contact T62, and the connector continues to rotate by virtue of the circuit:

Ground (positive terminal of regular battery), winding and breaker, R15, wire B, relay contact T33, R112, T102, combiner contact c8, relay contact R62, T44, negative regular battery.

When the connector reaches position 4, corresponding to a line serving the given subscriber, the control relay 6 is again energized over the circuit:

Positive terminal of the insulated battery, winding of control relay 6, relay contact T93, T106, combiner contact d8, bank b of numerical element X5, contact and brush S of the connector in position 4, relay contact T21, winding of relay 1, relay contact R14, wire S, relay contact T32, negative terminal of the insulated battery.

The test relay 5 is again placed in circuit and energized by relay contact T62, and the line is tested.

If the line 4 is busy, the connector continues its rotation.

When position 5 is reached, which is assigned to another subscriber, the situation is as on position 3, and the control relay 6 releases, and the line cannot be taken.

The connector, therefore, continues to rotate and arrives in position 6 corresponding to the last of the lines which serve the called subscriber under consideration.

When this position 6 is reached, the last line relay 11 is energized over the circuit:

Positive terminal of the insulated battery, winding of last line relay 11 contact R72, relay contact T103, T95, bank C of the numerical element X5, contact and brush S of the connector, relay contact T21, winding of relay 1, relay contact R14, wire S, relay contact T32, negative terminal of the insulated battery.

The rotation of the connector is stopped by the opening of relay contact R112 of last line relay 11.

The slow-acting busy relay 12 is placed in circuit and is energized over the circuit:

Ground (positive terminal of regular battery), winding of busy relay 12, relay contact T111, T101, combiner contact b8, relay contact T43, T51, T61, negative regular battery.

If this line 6 is free, the test relay 5 releases before busy relay 12 has had time to become energized. The connector relay 7 is energized over the circuit:

Ground (positive terminal of regular battery), winding of relay 7, relay contact T42, R51, T61, negative regular battery.

The relay 1 of the connector CO-1 is energized by virtue of the short-circuiting of the resistance connected in last line relay 11, by virtue of the circuit:

Positive terminal of the insulated battery, winding of relay 11, relay contact T72, T113, T103, T95, bank C of numerical element X5, contact and brush S of the connector in position 6, relay contact T21, winding of relay 1, relay contact R14, wire S, relay contact T32, negative terminal of the insulated battery.

The line wires are extended to the called subscriber, the call is set up, and the register can be released.

If the line 6 is busy, the test relay 5 does not release. Busy relay 12 has time to become energized. This relay 12 is the busy relay of the register ER-1. The closing of busy relay 12 causes the busy signal to be sent to the calling subscriber, by circuits known in the art, which do not form a part of the present invention.

If the number dialed by the calling subscriber were the number of any other line than the first numbered line, assigned to the called subscriber, such as the line in position 4, for example, then, in case the line so called is busy, the group relay 9 does not close and the hunting for another free line does not take place.

Similarly, if it is desired to assign additional lines to another subscriber whose listed number lies within the same decade, in order to prevent the mixing up of the lines of these two subscribers, because of the fact that the decade numerical element X5 is in the same position for both of these two subscribers, it is necessary to use a second group relay which will then be energized and closed instead of group relay 9, and which second group relay is designated as relay 8 in Figs. 3 and 4. The hunting of the intermediate lines and of the last line for this second subscriber having a plurality of lines, is then performed by means of banks *d* and *e* of the tens numerical element X5, by circuits similar to those previously described for the first considered subscriber.

Fig. 5 shows a circuit diagram of an embodiment according to the present invention, and which can be applied to a system with special marking multiple, which is individual for each marking device, in accordance with the block diagram of Fig. 2, which shows the R6 type of system. In the arrangement shown in Fig. 5, the choice of the group of lines is effected by means of the numerical element receiving the units digits.

Only the connector CO2 and the control switch COC2 of Fig. 2, have been shown in Fig. 5.

Only twelve successive positions of the connector CO2 have been shown, which are numbered from 1 to 12, and respectively correspond to the following lines:

Position 1: First line of the decade in which the called number is located.

Position 2: Isolated line not belonging to any group.

Position 3: First line of the group of the called group of lines belonging to the called subscriber.

Positions 4, 5, 7, 9, 10: Intermediate lines belonging to the called group of lines of the called subscriber.

Positions 6, 8, 12: Isolated line or lines belonging to other groups of other subscribers.

Position 11: Last line of the group of desired lines of the called subscriber.

It is further provided in the arrangement of Fig. 5, that the hunting for a free connector is effected by the wire T, the holding by the wire A, and that the dialing impulses are received in the form of battery impulses on the wire B.

When the connector is taken, the relay 19 of Fig. 5 is energized in series with the relay 13 over the circuit:

Ground (positive regular battery) on the wire A, relay contact R141 of relay 14, winding of relay 13, winding of relay 19, negative regular battery.

Relay 21 of Fig. 5 is energized over the circuit:

Ground (positive regular battery), relay contact T192 of relay 19, bank C in normal rest position of switch CC, winding of relay 21, negative regular battery.

When the subscriber dials, the impulses are received on relay 20 over the circuit:

Ground (positive regular battery), relay contact T211 of relay 21, winding of relay 20, relay contact T138 of relay 13, relay contact R144, wire B.

The switch advances by virtue of the completion of the circuit:

Ground (positive regular battery), relay contact T201 of relay 20, winding of switch CC, negative regular battery.

When the sending of the dialing impulses has been finished, the relay 21 releases, because the normal rest position of the bank C is blocked, and the second winding of relay 21 is short-circuited for a relatively long time interval by relay contact R201 of relay 20.

The connector begins to rotate by virtue of the completion of the circuit:

Ground (positive regular battery), bank C in engaged position of switch CC, relay contact R213 of relay 21, R182, R151, T135, R143, breaker and winding CR, negative regular battery.

When the connector passes onto the first line of the decade which contains the called subscriber, which in the case shown in Fig. 5, is assumed to be the fourth decade, the relay 15 is energized by virtue of the circuit:

Ground (positive regular battery), relay contact T133 of relay 13, wire C, bank *a* of switch CC in position 4, winding of relay 15, negative regular battery.

The rotation of the connector is stopped by the opening of contact R151, and the relay 18 (Fig. 5) is energized by virtue of the circuit:

Ground (positive regular battery), bank C, relay contact R213 of relay 21, R182, T151, bank *b* of switch CC, winding of relay 18, negative regular battery.

Switch CC comes into the intermediate rest position by virtue of completion of the circuit:

Ground (positive regular battery), bank C of switch CC, relay contact R213 of relay 21, T182, R174, breaker and winding CC, negative regular battery.

The relay 21 is again energized by virtue of the same circuit as before described for its first energization.

The switch is in the position for receiving the impulses constituting the units digit.

These impulses are received on the relay 20 (Fig. 5) by the circuit already described.

If this received units digit is a 4, as occurs in the case shown in Fig. 5, the switch arrives in the position 4 on its several banks *c, d, e, f, g*.

The connector starts to rotate by virtue of the completion of the circuit already described, and the relay 15 is energized upon passing onto the line by virtue of the completion of the circuit:

Ground (positive regular battery), relay contact T133 of relay 13, wire C, bank *d*, relay contact R221, winding of relay 15, negative regular battery.

The relay 16 is energized over the circuit:

Ground (positive regular battery), bank C of switch CC, relay contact R213, R182, T151, bank *g*, winding of relay 16, negative regular battery.

The test circuit is completed and if the line is free, the relay 14 is energized over the circuit:

Ground (positive regular battery), bank *c*, relay contact R213 of relay 21, R182, T161, resistance on relay 16, relay contact R171 of relay 17, T132, winding of relay 14, wire T, resistance and battery in the subscriber's station equipment.

The relay 14 completes, at its contacts T141, T142, T144, in actuated position, the continuity of the wires of the selector leading to the subscriber's station, and releases the control switch by opening its contact R141.

If the called subscriber is busy, the potential on contact T of the called subscriber is modified by the call which is then in existence thereon, and the relay 14 is not energized.

Further, if the line in question is the first of a group of lines, the relay 22 is energized by virtue of the circuit:

Ground (positive regular battery), relay contact T134 of relay 13, wire S, winding of relay 22, negative regular battery.

The relay 22 is held closed by virtue of the circuit:

Ground (positive regular battery), relay contact T192 of relay 19, T222, winding of relay 22, negative regular battery.

The control relay 15 opens by virtue of the opening of relay contact R221 of relay 22. The connector resumes its rotation by virtue of completion of the circuit which has already been described.

When the connector passes onto a line belonging to the same subscriber, the test circuit is completed over the circuit:

Ground (positive regular battery) relay contact T154 of relay 15, wire S, bank *f* of switch CC, resistance on relay 16, relay contact R171, T132, winding of relay 14, wire T, resistance, and negative regular battery.

If the line in question is free, the relay 14 is energized, stopping the rotation of the connector by opening relay contact R143, and provides through the circuits, as already described, the continuity of the wires to the subscriber, and the release of the control switch.

If the line in question is busy, the relay 14 remains in its normal rest position, and the rotation continues.

In order to cause the rotation to stop, it is necessary for the connector to be on a position corresponding to a free line and also for the wire S to be connected to the bank *f* on the position corresponding to the last digit (the units digit) of the number dialed by the calling subscriber.

When the connector reaches the last line corresponding to the called subscriber, the relay 15 is energized by virtue of the completion of the circuit:

Ground (positive regular battery), relay contact T134, of relay 13, wire S, bank *e* of switch CC, relay contact T221 of relay 22, winding of relay 15, negative regular battery.

The rotation of the connector is stopped by the opening of relay contact R151 of relay 15.

The relay 16 is energized over the circuit:

Ground (positive regular battery), bank C, relay contact R213 of relay 21, R182, T151, bank *g*, winding of relay 16, negative regular battery.

The test circuit is completed through:

Ground (positive regular battery), bank C of switch CC, relay contact R213 of relay 21, R182, T161, resistance on relay 16, relay contact R171, T132, winding of relay 14, wire T. If this last line is busy, the relay 14 is not energized and the relay 17 has time to close.

This operation causes the sending back of an impulse to the stages ahead of the connector, which brings about the release and return of the busy signal to the calling subscriber by the usual means forming a part of each plant.

When there are located on the banks of the connector, several subscribers with several lines interspersed, and whose units digits are the same, it is necessary to install several relays, such as the relay 22, each of these additional relays corresponding to one of these subscribers whose listed number thus ends in the same units digit. Each of these additional relays puts into service a set of banks such as the banks *c* and *f*, as shown in Fig. 3.

It will be apparent to those skilled in the art that my invention is susceptible of modifications to adapt the same to particular conditions, and all such modifications which are within the scope of the appended claims, I consider to be comprehended within the spirit of my invention.

Having thus described the invention, what is claimed is:

1. In a selection device for an automatic telephone or telegraph system comprising private branch exchanges a principal regular general battery for an exchange, a register comprising a marking switch for registering the units digits of the called subscriber, an auxiliary separate insulated battery individual to each said register, a main control relay and an auxiliary control relay; a connector having a first row of control terminals, a second row of control terminals and two wipers having the same orientation and simultaneously hunting over said rows respectively; a marking wire for connecting a terminal of said first row of control terminals to a terminal of a first row of terminals of said marking switch; a connection between one pole of said anxiliary separate battery and said wipers hunting over said two rows of control terminals; a connection between the wiper moving over said first row of terminals of said marking switch and the other pole of said auxiliary separate battery through the winding of said main control relay; a marking wire for connecting a first terminal of said second row of control terminals, having the same orientation as said terminal of said first row, to said second pole of said auxiliary separate battery through the winding of said auxiliary control relay; in the register, means for energizing said relay when the subscriber's line corresponding to said first terminal of said second row is busy and means for bringing about the release of said relay and the continuation of the hunting of said connector wipers.

2. A selection device according to claim 1 comprising: in said register a tens digit control relay and a tens digit marking switch having a first row of terminals, a first and a second additional row of terminals over which respectively move two wipers having the same orientation as the wiper moving over said first row of terminals of said switch; a connection between a second terminal of said second row of control terminals and the terminal of said first additional row which has the same orientation as said terminal of said first row of said switch, said second terminal of said second row of control terminals lying, with respect to the hunting direction of said wipers of said connector behind said first terminal of said second row; a connection between the wiper of said first additional row and said second mentioned pole of said auxiliary separate battery through the winding of said tens digit control relay, whereby said relay is energized when said wipers of said connector pass over said second terminal; a connection between a terminal of said second row of control terminals which lies at least as far as said second terminal from said first terminal and the terminal of said second additional row of terminals of said marking switch which has the same orientation as said terminal of said first additional row; and a connection between said wiper moving over said second additional row and said second mentioned pole of said auxiliary separate battery through the winding of said auxiliary control relay and a make contact of said tens digit control relay, whereby said auxiliary control relay is actuated when said wipers of said connector pass over said last mentioned terminal of said second row.

3. A selection device according to claim 2 comprising: a second tens digit control relay; a third and a fourth additional row of terminals in said marking switch, the wipers moving over said third and fourth rows respectively having the same orientation as said wipers moving over said first and second additional rows; a third and a fourth terminal in said second row of control terminals; and connections between said third and fourth control terminals, said third and said fourth additional rows of terminals, said second tens digit control relay, a make contact of said relay and all the other elements recited in claim 2 except said first and second control terminals, said first and said second additional rows of terminals, said first tens digit control relay and its make contact, said connections being identical with those recited in claim 2 with respect to said first and second terminals of said second row of control terminals.

HENRI LOUIS LESIGNE.

REFERENCES CITED

The following references are of record in the file of this patent:

UNITED STATES PATENTS

| Number | Name | Date |
|---|---|---|
| 1,597,784 | Gardner | Aug. 31, 1926 |
| 1,694,623 | Ostline | Dec. 11, 1928 |
| 1,716,986 | Stehlik | June 11, 1929 |
| 1,799,175 | Merk | Apr. 7, 1931 |
| 1,891,423 | Kahn | Dec. 20, 1932 |
| 2,190,140 | Taylor | Feb. 13, 1940 |